United States Patent [19]

Trevisson et al.

[11] 4,228,695
[45] Oct. 21, 1980

[54] COLLAPSIBLE-STEERING UNIT FOR MOTOR VEHICLES

[75] Inventors: Renato Trevisson, Arese; Guido Pizzocri, Gerenzano, both of Italy

[73] Assignee: Alfa Romeo S.p.A., Milan, Italy

[21] Appl. No.: 911,915

[22] Filed: Jun. 2, 1978

[30] Foreign Application Priority Data

Jun. 2, 1977 [IT] Italy .............................. 24319 A/77

[51] Int. Cl.² .............................................. B62D 1/18
[52] U.S. Cl. .................................... 74/492; 188/1 C; 280/777
[58] Field of Search ......................... 74/492; 188/1 C; 280/777

[56] References Cited

U.S. PATENT DOCUMENTS

| 3,505,897 | 4/1970 | Scheffler et al. | 74/492 |
| 3,785,671 | 1/1974 | Salewsky | 74/492 X |
| 3,803,938 | 4/1974 | Bratke et al. | 74/492 |
| 3,855,876 | 12/1974 | Albrecht et al. | 74/492 |
| 4,022,495 | 5/1977 | Pizzocri | 74/492 X |
| 4,117,741 | 10/1978 | Yazane et al. | 74/492 |

FOREIGN PATENT DOCUMENTS

| 2027828 | 2/1971 | Fed. Rep. of Germany | 280/777 |
| 2126173 | 12/1971 | Fed. Rep. of Germany | 74/492 |
| 2511810 | 10/1975 | Fed. Rep. of Germany | 74/492 |

*Primary Examiner*—Ramon S. Britts
*Assistant Examiner*—Robert W. Gibson, Jr.
*Attorney, Agent, or Firm*—Holman & Stern

[57] ABSTRACT

A collapsible steering unit for a motor car or similar vehicle is disclosed, in which a sheet-metal boxlike bracket is inserted in a bridge-like manner between the steering column sleeve and a point of the car body, said bracket being composed of a comparatively undeformable portion placed away of the steering column and a notched deformable portion placed near said column. The bracket is thus a differential-rigidity component part which ensures a nearly complete absorption of the shock energy.

4 Claims, 3 Drawing Figures

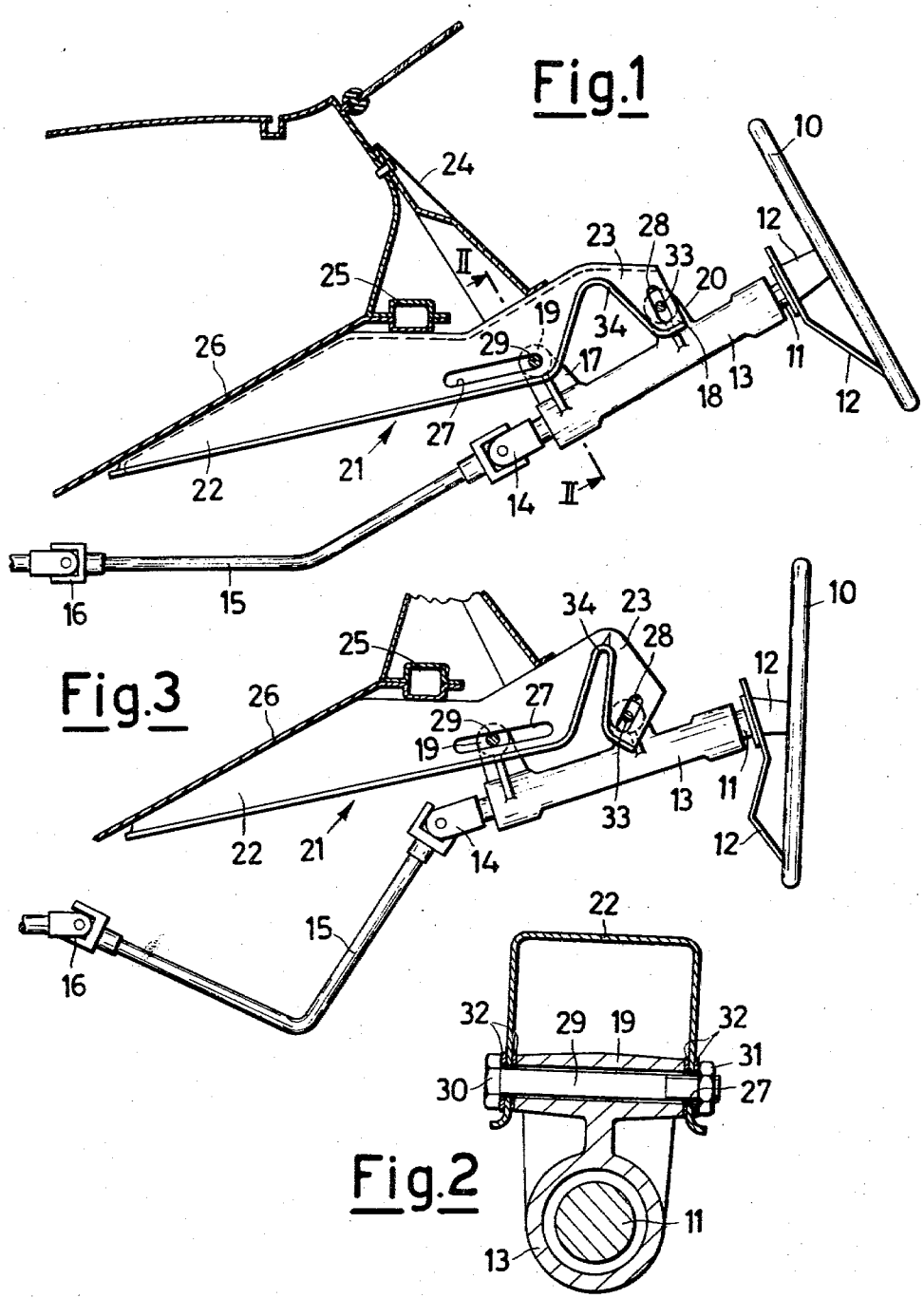

COLLAPSIBLE-STEERING UNIT FOR MOTOR VEHICLES

This invention relates to a collapsible steering unit for a motor car, which, in the case of the driver being hurled against the steering wheel, yields and is shifted forwards with a high degree of dissipation of the shock-energy, both due to the effect of the frictional relative sliding of members which are mutually engaged and to the effect of the deformation of yielding component parts.

A number of solution are known for the construction of collapsible steering units: generally, the steering column is equipped with a yieldable component part which can be deformed or which frictionally slides relative to its supporting member placed in the car body and, in a few instances, the supporting member itself is of the yieldable type or it can be frictionally slid relative to the car body.

The several approaches are not always capable of ensuring the desirable collapse of the steering unit: as a matter of fact, it is required, to this purpose, that the forward motion of the steering unit takes place with continuity and without jams and, moreover, with a dissipation of the shock-energy which is sufficient to brake the forward hurl of the driver and to prevent detrimental rebounds as well.

An object of the present invention is to provide a collapsible steering unit so conformed and sized as to afford the desirable functional features enumerated above, an additional object being that of providing a collpasible steering unit which is simple to construct, cheap, and has a limited bulk so as to be conveniently mounted on a car.

The collapsible steering unit according to this invention comprises a steering column equipped with a deformable member, a steering wheel operatively connected to said column, means adapted to support the column for rotation and means for anchoring to the car body said supporting means for the column, and is characterized in that said anchoring means are composed by a comparatively rigid integral structure and by a deformable structure, said column-supporting means being fastened to said comparatively rigid structure by first connection means adapte to allow the sliding motion of said column-supporting means along a preselected direction when the car driver is hurled against the steering wheel, said column-supporting means being then made integral with said deformable structure by the agency of second connection means.

Features and advantages of the present invention will be more clearly understood by scrutinizing FIGS. 1 to 3 of the accompanying drawings, in which a nonlimiting exemplary embodiment of the invention is shown.

In the drawings:

FIG. 1 is a side elevational view of the collapsible steering unit according to the invention;

FIG. 2 is a closeup partial cross-sectional view taken along the line II—II of FIG. 1, and FIG. 3 is a side elevational view of the steering unit of FIG. 1 shown in its collapsed configuration, after that the driver has been hurled against the steering wheel.

In FIG. 1, the numeral 10 indicates the steering-wheel connected to the shaft 11 of the steering column by the agency of spokes 12, and the numeral 13 indicates a sleeve in which the shaft 11 is mounted for rotation. The shaft 11 is connected by a cardan joint 14 to a second shaft, shown at 15, which has its axis both bent and eccentric relative to the straight line conjoining the center of the joint 14 with the center of the cardan joint, shown at 14, which connects the shaft 15 to the steering mechanism proper, the latter being not shown.

Integrally with the sleeve 13 there are two bracing members, shown at 17 and 18, each of which is fitted with a bushing, 19 and 20, respectively, the axis of which is perpendicular to the plane of the drawing, as viewed in FIG. 1.

The numeral 21 generally indicates a bracket for anchoring the sleeve 13 to the car body. The bracket 21 is composed by a bent metal sheet having substantially an outline in the form of a "U" in cross-section and comprises a comparatively rigid structure, indicated at 22 and a yieldable structure, indicated at 23, the latter structure being an extension of the former.

The portion 22 of the bracket 21 is fastened to the car body and, more particularly (for example by welding) to the metal sheet 24 of the dashboard, to the strut 25 and to the wall 26 which is the front boundary of the passenger compartment.

Structure 22 is equipped, in correspondence with the end near the area of connection with the structure 23, with a couple of slots, shown at 27, formed through the two sidewalls which make up the webs of the sheet metal U-section. The long axis of the slots 27 is substantially parallel to the axis of the shaft 11, but it could also be horizontal. In the couple of slots 27 a pin is inserted, indicated at 29, which is borne by the bush 19 of the bracing member 17 of the sleeve 13. The pin 29 is the stem of a screw, generally indicated at 30, which can best be seen in FIG. 2. The screw 30 is fastened to the sidewalls of the structure 22 by a nut 31, a number of washers of a frictional material being interposed therebetween, such washers being shown at 32. The yieldable structure 23 has a couple of notches, shown at 34, formed through the sheet metal of the sidewalls and providing a deformation-prone area, and has a couple of slots, indicated at 28 and formed through the sheet metal of the two sidewalls forming the webs of the U-shaped section, the slots being placed at the end opposite to the end connected to the structure 22. The slots 28 have their long axes substantially perpendicular to the axis of the steer shaft 11 and receive a pin, indicated at 33, borne by the bushing 20 of the bracing member 18 of the sleeve 13.

The pin 33 is fastened to the sidewalls of the structure 23 by the agency of manual-adjustment means: these are not shown because they are conventional.

These adjustment means permit to adjust the level of the steering wheel 10 consistently with the driver's comfort: by releasing them, the pin 33 of the bracing member 18 can slide in the slots 28, since the shaft 11 is free to swing about the axis of the pin 29, whereafter the pin 33 can be locked in the desired position.

Should the driver be hurled against the steering wheel with a force having a magnitude exceeding a reselected limiting value, the steering wheel takes the collapsed configuration shown in FIG. 3. At the outset, the spokes 12 are so deformed that the steering wheel 10 is swung relative to the shaft 11 and becomes arranged parallely to the driver's chest and thus perpendicularly to the line of action of the shock force, whereafter the yieldable structure 23 begins to become deformed and is bent in correspondence with the least-resistance area, that is, in correspondence with the apexes of the notches 34. Simultaneously, the pin 29 is frictionally slid in the slots 27 (due to the action of the washers 33) and the shaft 15 is bent further.

The approach suggested herein is such that the degree of dissipation of the shock-energy is high, due to the additive action of the deformation of the structure 23, the deformation of the shaft 15 and the frictional sliding effect of the pin 29 in the slots 27.

Thus, the steering unit is displaced continuously in the direction of the line of action of the shock force without any jam being experienced.

We claim:

1. A collapsible-steering unit for a motor vehicle comprising a steering column having a deformable section, a steering wheel connected to said column, column support means for rotatably supporting said column, anchoring means for attaching said column support means to a vehicle body said anchoring means including a first relatively rigid part and a second part yieldingly connected to said relatively rigid part for movement in a preselected direction upon driver impact with the steering wheel, first connection means between said column support means and said first part of said anchoring means, said first connection means being independent of said second part of said anchoring means and permitting movement of said column supporting means relative to said first part of said anchoring means in said preselected direction upon driver impact with the steering wheel, friction means between said first connection means and said first part of said anchoring means and second connection means between said column support means and said second part of said anchoring means.

2. The unit as defined in claim 1 wherein said second part of said anchoring means is an extension of said first part of said anchoring means.

3. The unit as defined in claim 2 wherein said anchoring means is a sheet metal member of substantially U-shaped cross-section.

4. The unit as defined in claim 3 wherein said sheet metal member has side walls each defining a notch between said first and second parts of said anchoring means.

* * * * *